United States Patent
Wang

(10) Patent No.: US 7,505,051 B2
(45) Date of Patent: Mar. 17, 2009

(54) METHOD FOR GENERATING A SLIDE SHOW OF AN IMAGE

(75) Inventor: Fu-Sheng Wang, Taipei (TW)

(73) Assignee: Corel TW Corp., Taipei (TW)

( * ) Notice: Subject to any disclaimer, the term of this patent is extended or adjusted under 35 U.S.C. 154(b) by 463 days.

(21) Appl. No.: 11/013,811

(22) Filed: Dec. 16, 2004

(65) Prior Publication Data
US 2006/0132507 A1 Jun. 22, 2006

(51) Int. Cl.
*G09G 5/30* (2006.01)
(52) U.S. Cl. .................... 345/660; 345/473; 345/698; 348/208.6; 348/211.9; 715/730; 715/732
(58) Field of Classification Search ............... 345/660, 345/698, 473; 348/208.6, 211.9; 715/730, 715/732
See application file for complete search history.

(56) References Cited

U.S. PATENT DOCUMENTS

| | | | | |
|---|---|---|---|---|
| 5,951,646 | A * | 9/1999 | Brandon ...................... 709/231 |
| 6,044,180 | A * | 3/2000 | Brandestini et al. ......... 382/274 |
| 6,182,067 | B1 * | 1/2001 | Presnell et al. ................. 707/5 |
| 6,396,500 | B1 * | 5/2002 | Qureshi et al. ............... 345/473 |
| 6,639,649 | B2 * | 10/2003 | Fredlund et al. ............... 352/12 |
| 6,943,752 | B2 * | 9/2005 | Masumoto et al. ........... 345/1.1 |
| 6,956,589 | B2 * | 10/2005 | Lipsky et al. ................ 345/667 |
| 6,957,387 | B2 * | 10/2005 | Barbieri ....................... 715/719 |
| 6,957,389 | B2 * | 10/2005 | Faraday et al. .............. 715/731 |
| 7,051,291 | B2 * | 5/2006 | Sciammarella et al. ....... 715/838 |
| 7,058,647 | B1 * | 6/2006 | Hill ............................. 707/102 |
| 7,111,239 | B2 * | 9/2006 | Morris-Yates ............... 715/709 |
| 7,119,818 | B2 * | 10/2006 | Takiguchi ..................... 715/764 |
| 7,134,078 | B2 * | 11/2006 | Vaarala ........................ 715/730 |
| 7,142,225 | B1 * | 11/2006 | Boler et al. .................. 345/619 |
| 7,149,973 | B2 * | 12/2006 | Dias et al. .................... 715/717 |
| 2002/0147834 | A1 * | 10/2002 | Liou et al. .................... 709/236 |
| 2002/0159632 | A1 * | 10/2002 | Chui et al. .................... 382/168 |
| 2003/0160814 | A1 * | 8/2003 | Brown .......................... 345/732 |

(Continued)

OTHER PUBLICATIONS

KM-4 (knowledge management): distributed knowledge management: Swoogle: a search and metadata engine for the semantic web Li Ding, Tim Finin, Anupam Joshi, Rong Pan, R. Scott Cost, Yun Peng, Pavan Reddivari, Vishal Doshi, Joel Sachs Nov. 2004 Proceedings of the thirteenth ACM international conference on Information and knowledge management.*

(Continued)

*Primary Examiner*—Kee M Tung
*Assistant Examiner*—Javid A Amini
(74) *Attorney, Agent, or Firm*—Kusner & Jaffe

(57) ABSTRACT

The present invention discloses methods for generating a slide show of an image. With the methods, every still image could be displayed with the vivid effect of a dynamic video. The steps of one method according to the present invention comprise: performing a semantic analysis of a image for detecting semantic regions; selecting a first region and a second region from the semantic regions; determining a first and a second zooming levels of the first and second regions, respectively; and generating a slide show of the image by panning the image from the first region to the second region while zooming the image from the first zooming level to the second zooming level, gradually.

49 Claims, 2 Drawing Sheets

U.S. PATENT DOCUMENTS

| | | | |
|---|---|---|---|
| 2004/0122539 A1* | 6/2004 | Ainsworth | 700/94 |
| 2004/0125877 A1* | 7/2004 | Chang et al. | 375/240.28 |
| 2004/0130550 A1* | 7/2004 | Blanco et al. | 345/473 |
| 2004/0131261 A1* | 7/2004 | Lee et al. | 382/232 |
| 2004/0205477 A1* | 10/2004 | Lin | 715/500.1 |
| 2004/0221322 A1* | 11/2004 | Shen et al. | 725/135 |
| 2004/0230572 A1* | 11/2004 | Omoigui | 707/3 |
| 2004/0230636 A1* | 11/2004 | Masuoka et al. | 708/800 |
| 2005/0034077 A1* | 2/2005 | Jaeger | 715/732 |
| 2005/0081154 A1* | 4/2005 | Vogel | 715/710 |
| 2005/0081247 A1* | 4/2005 | Lipsky et al. | 725/109 |
| 2005/0097470 A1* | 5/2005 | Dias et al. | 715/723 |
| 2005/0102624 A1* | 5/2005 | McIntyre | 715/723 |
| 2005/0138570 A1* | 6/2005 | Good et al. | 715/789 |
| 2005/0160368 A1* | 7/2005 | Liu et al. | 715/762 |
| 2005/0182503 A1* | 8/2005 | Lin et al. | 700/94 |
| 2005/0185823 A1* | 8/2005 | Brown et al. | 382/103 |
| 2005/0240756 A1* | 10/2005 | Mayer | 713/2 |
| 2005/0275805 A1* | 12/2005 | Lin et al. | 352/12 |
| 2006/0070001 A1* | 3/2006 | Liu et al. | 715/732 |
| 2006/0101005 A1* | 5/2006 | Yang et al. | 707/3 |
| 2006/0129596 A1* | 6/2006 | Bays et al. | 707/102 |
| 2006/0129933 A1* | 6/2006 | Land et al. | 715/723 |
| 2006/0204110 A1* | 9/2006 | Steinberg et al. | 382/224 |
| 2006/0218171 A1* | 9/2006 | Wakeam et al. | 707/101 |
| 2006/0265643 A1* | 11/2006 | Saft et al. | 715/517 |
| 2006/0282779 A1* | 12/2006 | Collins et al. | 715/732 |
| 2007/0033528 A1* | 2/2007 | Merril et al. | 715/732 |
| 2007/0081197 A1* | 4/2007 | Omoigui | 358/403 |

OTHER PUBLICATIONS

Internet and WWW-based systems: A web-enabled video indexing system Jian Zhou, Xiao-Ping Zhang Oct. 2004 Proceedings of the 6th ACM SIGMM international workshop on Multimedia information retrieval MIR '04 Publisher: ACM Press.*

U. Schneider, D. Werner: Taschenbuch der Informatik, 4$^{th}$ edition, Carl Hanser Verlag, 2001, pp. 299-301, ISBN 3-446-21753-3, English translation included.

A. Iwainsky, W. Wilhelmi: Lexikon der Comutergrafik und Bildverarbeitung, Vieweg, 1994, pp. 53, 54, 209, 263, and 306, ISBN 3-528-05342-9, English translation included.

* cited by examiner

METHOD FOR GENERATING A SLIDE SHOW OF AN IMAGE

FIELD OF THE INVENTION

The present invention is related to a method for generating a slide show of an image, especially to a method for generating a slide show of one or more digital images by zooming and panning the digital images.

BACKGROUND OF THE INVENTION

People like taking pictures in special occasions and tourist spots. With the progress of digital image technology, the conventional cameras are gradually replaced by digital cameras. In recent years, in order to improve the picture quality of a captured image, the number of pixels of CCD image capturing device is being remarkably increased in a digital camera. The larger the number of display pixels becomes, the slower a processing speed gets, resulting in difficulty in displaying a line view smoothly. Consequently, it is not realistic to perform a displaying process by using all of the number of pixels of the image capturing part. These pictures could be stored in digital forms as image files, so the user may view the photos through a computer or any other digital device, such as cellular phone, PDA, or even a digital camera. The image data captured by a digital camera is generally transferred to a personal computer and other data processing devices for being further processed, stored, or printed. The digital camera is equipped with a host interface for connecting the digital camera to a personal computer in order to transfer image data to the personal computer as a host computer so as to process and/or store the image data. Therefore, by the digitized function of the digital camera and the data processing ability of the personal computer, the applications of the digital image are more and more popular in the daily life. Moreover, the photographs stored in a personal computer can be processed or added with multimedia effect. Although taken by a conventional camera, the pictures may still be stored as image files through a scanner. Hence, almost all pictures could be treated as digital files. The user therefore could utilize the device with the ability of simple image processing to review the occasions and scenery of the pictures. However, the picture could only capture and preserve still image. Comparing with the video, the picture is boring and dull. Everyone in the picture is still and frozen. Especially there are many friends or relatives in that occasion.

The convention way to make the still image more vivid is generating a slide show of plentiful images. At first, the user chooses some image files from the storage means, and determines the display sequence or time interval if needed. Then the computer would display these selected images one after another, manually or automatically. With more elaborate functions, the computer may further shrink or enlarge the whole images to fit the window or screen.

Even though displayed in a conventional slide show, the pictures are still images as before. To make the pictures or still images more animated and multimedia-effective, what is desired is an attractive way for presenting an image.

SUMMARY OF THE INVENTION

In light of the aforementioned problems, the present invention thus provides methods and storage mediums for generating a slide show of an image. With the present invention, pictures could be displayed to simulate the effect of video cameras. In other words, the user may feel like watching a video while viewing the slide show. Accordingly, the present invention discloses much more interesting and attracting ways to appreciate pictures.

According to one aspect of the present invention, a method for generating a slide show of an image is disclosed. First, a semantic analysis of the image would be performed for detecting semantic regions, wherein the semantic analysis may include the human face detection, and the semantic regions may include a human face or a neighborhood with a predetermined area surrounding a focus of the image. Then, a first region and a second region are selected from the detected semantic regions, and the first and second zooming levels of the first and second regions are determined, respectively. Right after that, the slide show of the image is generated by panning the image from the first region to the second region while the image is zoomed from the first zooming level to the second zooming level, gradually.

According to another aspect of the present invention, a method for generating a slide show of an image is disclosed. First, a semantic analysis of the image would be performed for detecting a semantic region, wherein the semantic analysis may include the human face detection, and the semantic region may be a human face or a neighborhood with a predetermined area surrounding a focus of the image. Next, the zooming status of the semantic region is determined according to a zooming code. The data in the zooming code may include a first number of zoom-in times, a second number of zoom-out times, a ratio of the semantic region area to the image area, and a distance between the semantic region center and the image center. Then, the slide show of the image is generated by zooming the image according to the zooming status.

According to another aspect of the present invention, a method for generating a slide show of an image is disclosed. First, a non-semantic analysis of the image would be performed for detecting non-semantic regions, wherein the non-semantic analysis may include the symmetric region detection, and the non-semantic regions may include the regions with symmetric regions and a neighborhood with a predetermined area surrounding a focus of the image. Then, a first region and a second region are selected from the detected non-semantic regions, and the first and second zooming levels of the first and second regions are determined, respectively. Right after that, the slide show of the image is generated by panning the image from the first region to the second region while the image is zoomed from the first zooming level to the second zooming level, gradually.

DETAILED DESCRIPTION OF THE PREFERRED EMBODIMENT

The present invention is described with the preferred embodiments and accompanying drawings. It should be appreciated that all the embodiments are merely used for illustration. Hence, the present invention can also be applied to various embodiments other than the preferred embodiments. Besides, the present invention is not limited to any embodiment but to the appending claims and their equivalents.

Figure 1:
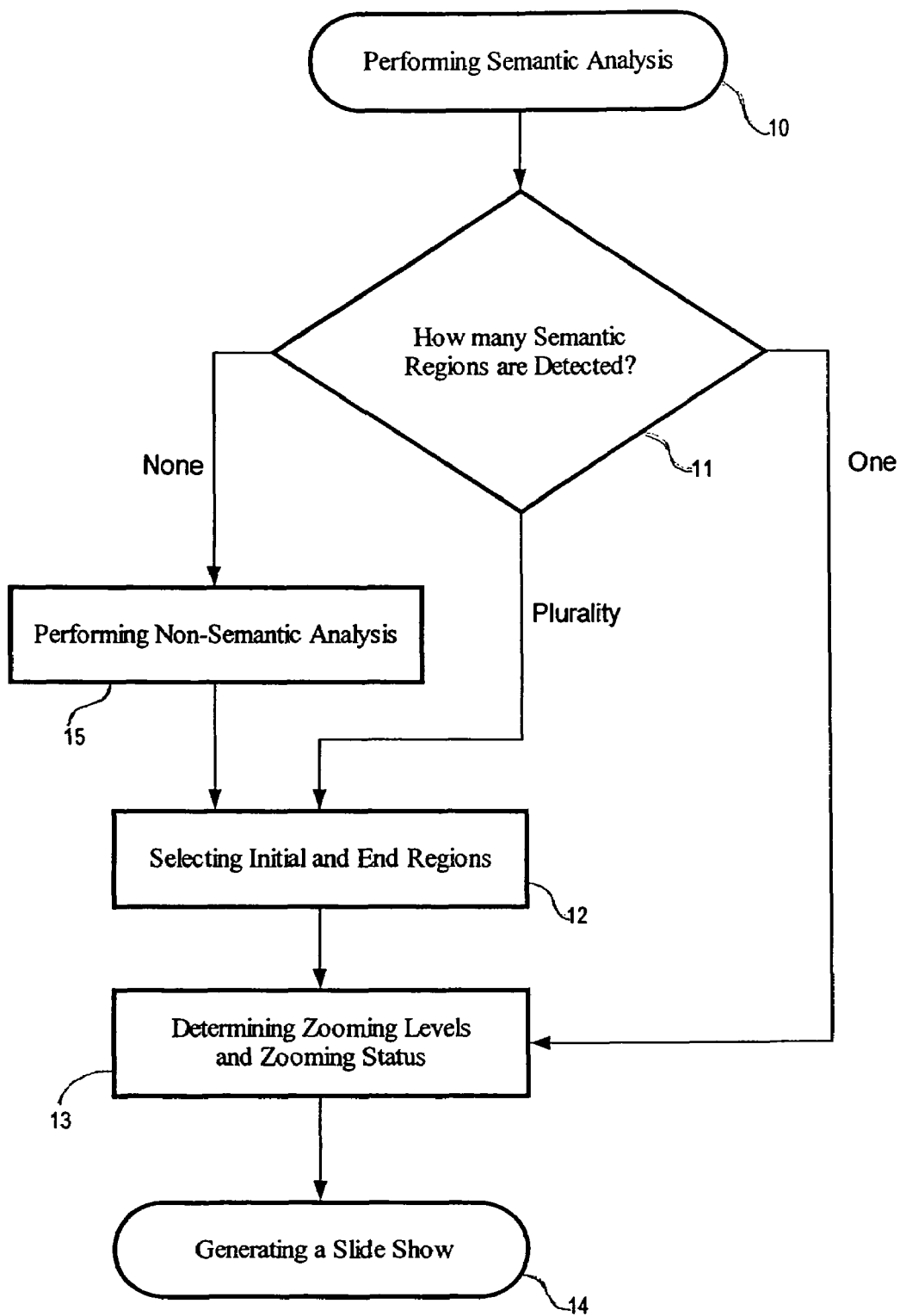
FIG. 1 is a flow chart of the method of the present invention.

Referring to FIG. 1, a method for generating a slide show of an image is presented. It should be appreciated that the present invention is able to be applied in multiple images through processing the images one after another, although a slide show for single image is generated in the preferred embodiment of present invention. In other words, the present invention certainly could be utilized to generating a slide show of plural images.

Before the semantic analysis is performed in step 10, at least one image may be selected. If there are two or more selected images, they would be processed sequentially. Besides, the images are preferably stored in some storage means as digital files. In step 10, the semantic analysis of the image is performed to detect semantic regions. These semantic regions may contain semantic objects which are something meaningful to a user, such as human faces, cars, text, and other objects that a user might be interested in. In one embodiment of the present invention, the semantic analysis may include human face detection and each semantic region may contain a human face therein. The technology of human face detection is various and well-known to those who are skilled in the art, so the description of the details is omitted to prevent from obscuring the present invention. The related references about the face detection algorithms include: "Neural Network-Based Face Detection," Rowley H., Baluja S. and Kanade T., Proc. IEEE Conf. on Computer Vision and Pattern Recognition, San Francisco, Calif., pp. 203-207; "Example-based learning for view-based human face detection," Poggio T., Sung K. K., Proc. of the ARPA Image Understanding Workshop, pp. 843-850, 1994; "Face detection in color images," R.-L. Hsu, M. Abdel-Mottaleb, and A. K. Jain, IEEE Trans. Pattern Analysis and Machine Intelligence, vol. 24, no. 5, pp. 696-706, May 2002; and "Face detection by aggregated bayesian network classiers," T. V. Pham, M. Worring and A. W. M. Smeulders, Technical Report 2001-04, Intelligent Sensory Information Systems Group, University of Amsterdam, February 2001. Since the human faces are usually the relative important parts of an image, the generated slide show should emphasize these semantic regions.

After the semantic analysis is performed, some semantic regions may be detected. In step 11, the number of the detected semantic regions is checked. If there are two or more semantic regions detected in an image, two of these semantic regions would be selected as the initial region and the end region (in the case of two regions), as shown in step 12. For instance, the semantic regions might be sorted according to their x-coordinates, and then the leftmost and the rightmost semantic regions would be chosen as the initial and the end regions, respectively. Alternatively, it could be set to select more than two regions, therefore, the first, the second and the third regions are possible. Next, the ratio of the initial region area to the image area and the ratio of the end region area to the image area would be calculated, respectively. Also, the distance between the initial region center and the image center as well as the distance between the end region center and the image center would be calculated, respectively. The aforementioned ratios and distances are the parameters used to determine the first zooming level of the initial region and the second zooming level of the end region, as in step 13. However, the zooming levels may still be determined according to other factors in other embodiment of the present invention, such as the zooming statuses of other images. Additionally, the first zooming level is preferably different from the second zooming level.

To generate a slide show in step 14, the image is panned from the initial region to the end region. At the same time, if the first and second zooming levels are different, the image is zoomed from the first zooming level to the second zooming level gradually in the panning process. However, if both the zooming levels are identical, and the image may be merely panned with fixed zooming level. Therefore, the generated slide show could simulate a video camera filming the scene where the image was taken. In other words, the user may feel like watching a video of that scene but actually view a slide show of a still image.

In one embodiment of the present invention, the zooming status would also be determined in step 13. There are two kinds of zooming statuses, namely, zoom-in and zoom-out. To select a zooming status, the zooming code would be taken into consideration. The zooming code is mainly used to record certain information about the present image and about the zooming statuses of former images. In one embodiment of the present invention, the zooming code may include the data of the number of zoom-in times, the number of zoom-out times, the ratio of the detected semantic region to the whole image, and the distance between the detected semantic region center and said image center. The numbers of zoom-in times and zoom-out times records the zooming statuses of former images. For instance, in the situation that the ratio of the detected semantic region area to the whole image area is smaller than a predetermined threshold, the zoom-in is preferably selected as the zooming status for the purpose of showing the interested regions clearly to the user. However, if the number of zoom-in times is greater than a predetermined threshold, the zooming status may preferably set to zoom-out. If too many zoom-ins or zoom-outs are performed consecutively, it might be tiresome to our audiences and therefore the numbers of zoom-in times and zoom-out times should be also considered.

If only one semantic region is detected, the zooming level of that semantic region and the zooming status of the image would be determined in step 13. Next, the slide show of the image with only one detected semantic region would be generated in step 14. In one embodiment of the present invention, the image would be centered on the semantic region and zoomed according to the zooming status. Hence, the zoom function of video camera could be simulated as the slide show is displayed. However, when a person takes a picture, the focus is usually located on the most important site. Therefore, the neighborhood surrounding the focus is generally significant to the user. In one embodiment of the present invention, the semantic regions would further include the neighborhood surrounding the focus of the image. The area of such neighborhood is preferably predetermined or determined according to the area of whole image. Additionally, in the situation that an image has multiple focuses, the semantic regions would include the neighborhood surrounding each focus in that image. In one embodiment of the present invention, the information of the focus could be obtained from the image file in Exif format. In this situation, as merely one semantic region is detected in an image, the neighborhood surrounding the focus of the image may be taken as additional semantic region. Therefore, the image could be treated as the image with plural detected semantic regions. Besides, in the situation that the image has plural detected semantic regions, the above neighborhoods may still be included as the semantic regions. If no semantic region is detected in step 10, the non-semantic analysis would be performed in step 15. In one embodiment of the present invention, such non-semantic analysis may include symmetric region detection and the detected non-semantic regions may include regions with a symmetric pattern therein. The symmetric region detection may be implemented by searching symmetric points and setting a region containing each group of relative symmetric points. Besides, non-semantic regions of an image are the salient parts containing low-level visual information which could catch the user's attention, such as an object showing high symmetry and a region showing high contrast or strong edges. In general, user's attention is tended to be drawn to non-semantic regions without the intention to search for some particular object. The technology of symmetric region detection is various and well-known to those who are skilled in the art, so the description of the details is omitted to prevent from obscuring the present invention. The related references about the symmetry operators and low-level visual features include: "Context free attentional operators: the generalized symmetry transform," D. Reisfeld, H. Wolfson, and Y. Yeshurun, Int. J. of Computer Vision, Special Issue on Qualitative Vision, 14:119-130, 1995; "The discrete symmetry transform in computer vision," Di Ges'u V. and Valenti C., Tech. Rep. DMA-011/95, DMA Univ. Palermo, Palermo, 1995; "Detecting symmetry in grey level images: The global optimization approach," Y. Gofman and N. Kiryati., In ICPR, page A94.2, 1996; "Automatic identification of perceptually important regions in an image using a model of the human visual system," W. Osberger and A. Maeder, Submitted to 14th International Conference on Pattern Recognition, August 1998; and "Evaluation of Interest Point Detectors," C. Schmid, R. Mohrand and C. Bauckhage, Int'l Journal of Computer Vision, 37(2), 151-172, 2000.

With these detected non-semantic regions, the image would be processed similarly to the image with plural semantic regions, as set forth above. In step 12, two non-semantic regions would be selected as initial and end regions, respectively. After that, first and second zooming levels individually corresponding to the initial and end regions would be determined according to the same factors as mentioned above in step 13. Finally, a slide show of the image with non-semantic regions would be generated in step 14. Since the process of non-semantic situation is similar to that of semantic situation, most details would be omitted for conciseness.

Figure 2:
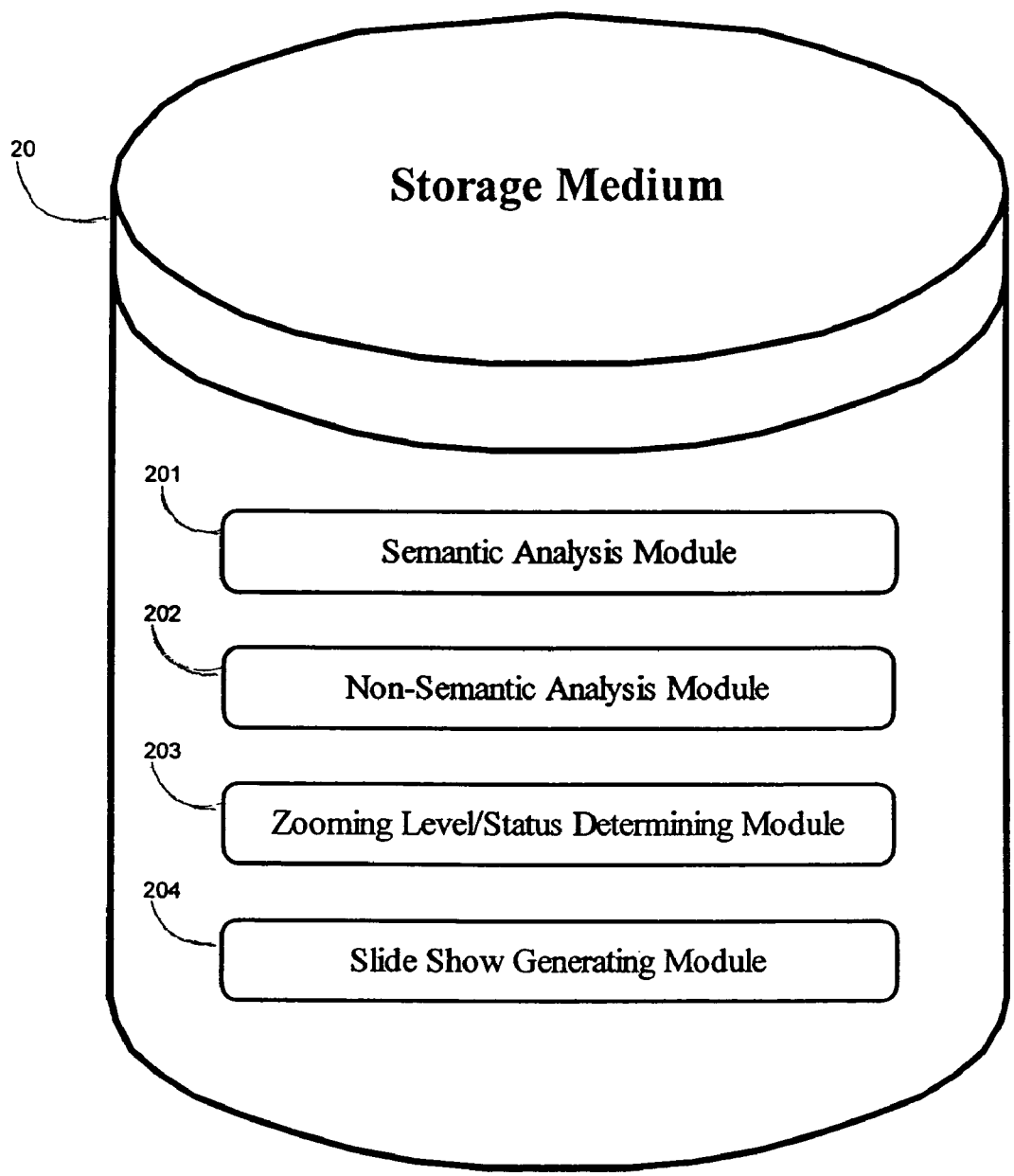
FIG. 2 is a storage medium of the present invention.

Another aspect of the present invention is to disclose a computer-readable storage medium having computer-executable instructions for generating a slide show of an image, as shown in FIG. 2. In one embodiment of the present invention, such computer-readable storage medium 20 may comprise four modules, which are the semantic analysis module 201, the non-semantic analysis module 202, the zooming level/status determining module 203, and the slide show generating module 204. These modules could be the computer software or a serious of computer-executable instructions. In one embodiment of the present invention, the types of the computer-readable storage medium may be the compact disc (CD), the digital video disc (DVD), the Blu-ray disc, the floppy disc, the hard disc or the flash memory. It should be appreciated that these types are enumerated merely for illustration, instead of limitation. All other possible kinds of storage medium with the ability of storing digital data should be encompassed by the present invention.

The image is firstly treated by the semantic module 201 to detect the semantic region. If plural semantic regions are detected, two of them would be selected as the initial and end regions, respectively. The zooming level/status determining module 203 would decide the first zooming level of the initial region and the second zooming level of the end region. The zooming levels are both decided according to the ratio of their area to the image area and the distance between their centers and the image centers. Besides, the zooming level/status determining module 203 would also decide the zooming status according to the zooming code. The data and functions of the zooming code have been described above, and therefore omitted.

In one embodiment of the present invention, the semantic analysis module 201 may include the function of human face detection. Besides, the semantic regions may include the region of human face and the neighborhood surrounding each focus.

If it is unfortunate that no semantic region is detected, the image without semantic region would be treated by the non-semantic analysis module 202 to detect the non-semantic regions. Similarly, two of the non-semantic regions would be selected as the initial and end regions, respectively. The zooming level/status determining module 203 would decide the first zooming level of the initial region and the second zooming level of the end region.

To generate a slide show, the image with initial and end regions would be panned from the initial region to the end region. Also, if the zooming level of each region is different, the image would be zoomed in or out while being panned. For instance, if the first zooming level is two times (2 ×), and the second zooming level is one-third times ($\frac{1}{3}$×). The image would be zoomed in by three times firstly, and then gradually become being zoomed out by one-third times. In the situation that the image merely has one semantic region, the image would be centered on that semantic region. At the same time, the image would be zoomed in or out according to the zooming status. Therefore, a vivid slide show of the image would be generated to simulate the effect of the video.

In one embodiment of the present invention, a panning path would be determined according to the distribution of the semantic or non-semantic regions. In the slide show, the image would be panned along the panning path across at least two regions. The both ends of the panning path are preferably the centers of initial and end regions, respectively. The line shape would be varied with the distribution of the regions. For example, the panning path may be a straight line or a curve.

Further, the aforementioned modules of the computer-readable storage medium 20 are able to process plural images, although the above descriptions are all about process of single image. To process plural images, the modules could treat them one after another, and generating a slide show of plural images. Hence, such a slide show could display plural images sequentially with the simulation of video effects. Moreover, the photographs stored in a personal computer or portable device can be processed with fantastic multimedia effect.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

I claim:

1. A method for generating a slide show of a still image by executing computer-executable instructions stored in a computer-readable storage medium, said method comprising:

performing a semantic analysis of said still image to detect semantic regions of the still image;

selecting a first region and a second region from among said semantic regions of the still image, wherein said first region and said second region are different regions of the still image;

determining a first zooming level of said first region and a second zooming level of said second region, wherein the first zooming level is different from the second zooming level; and generating said slide show of said still image to simulate video effect by panning across said still image from said first region to said second region while gradually zooming said still image from said first zooming level of said first region to said second zooming level of said second region.

2. The method as set forth in claim 1, wherein said semantic analysis includes human face detection.

3. The method as set forth in claim 1, wherein each of said semantic regions further comprises a neighborhood with a predetermined area surrounding a focus of said still image, and information of said focus is recorded in the tag of said still image in Exif format.

4. The method as set forth in claim 1, wherein panning said still image from said first region to said second region includes panning along a panning path across at least two of said semantic regions.

5. The method as set forth in claim 1, wherein said first zooming level is determined according to a first ratio of said first region area to said still image area and a first distance between said first region center and said still image center, and said second zooming level is determined according to a second ratio of said second region area to said still image area and a second distance between said second region center and said still image center.

6. The method as set forth in claim 1, which further comprises the step of determining a zooming status of said still image according to the zooming status of at least one former still image.

7. A method as set forth in claim 1, wherein a portion of said first region overlaps with a portion of said second region.

8. A method for generating a slide show of a still image by executing computer-executable instructions stored in a computer-readable storage medium, said method comprising:
    performing a semantic analysis of said still image to detect a semantic region of the still image, said still image having a still image area and a still image center, and said semantic region having a semantic region area and a semantic region center;
    establishing a zooming code by determining a first number of zoom-in times indicative of the number of zoom-in times of at least one former still image, determining a second number of zoom-out times indicative of the number of zoom-out times of at least one former still image, determining a ratio of said semantic region area to said still image area, and determining a distance between said semantic region center and said still image center;
    determining a zooming level of said semantic region and a zooming stats of said still image according to the zooming code; and
    generating said slide show of said still image to simulate video effect by zooming said still image centered on said semantic region according to said zooming level and said zooming status.

9. The method as set forth in claim 8, wherein said semantic analysis includes human face detection.

10. A method for generating a slide show of a still image by executing computer-executable instructions stored in a computer-readable storage medium, said method comprising:
    performing non-semantic analysis of said still image to detect non-semantic regions of the still image;
    selecting a first region and a second region from among said non-semantic regions of the still image, wherein said first region and said second region are different regions of the still image;
    determining a first zooming level of said first region and a second zooming level of said second region, wherein the first zooming level is different from the second zooming level; and
    generating said slide show of said still image to simulate video effect by panning across said still image from said first region to said second region while gradually zooming said still image from said first zooming level of said first region to said second zooming level of said second region.

11. The method as set forth in claim 10, wherein said non-semantic analysis includes symmetric region detection.

12. The method as set forth in claim 10, wherein each of said non-semantic regions further comprises a neighborhood with a predetermined area surrounding a focus of said still image, and information of said focus is recorded in the tag of said still image in Exif format.

13. The method as set forth in claim 10, wherein panning said still image from said first region to said second region includes panning along a panning path across at least two of said non-semantic regions.

14. The method as set forth in claim 10, wherein said first zooming level is determined according to a first ratio of said first region area to said still image area and a first distance between said first region center and said stilt image center, and said second zooming level is determined according to a second ratio of said second region area to said still image area and a second distance between said second region center and said still image center.

15. The method as set forth in claim 10, which further comprises the step of determining a zooming status of said still image according to the zooming status of at least one former still image.

16. A method as set forth in claim 10, wherein a portion of said first region overlaps with a portion of said second region.

17. A computer-readable storage medium having computer-executable instructions for generating a slide show of a still image by performing the following, comprising:
    performing a semantic analysis of said still image to detect semantic regions of the still image;
    selecting a first region and a second region from among said semantic regions of the still image, wherein said first region and said second region are different regions of the still image;
    determining a first zooming level of said first region and a second zooming level of said second region, wherein the first zooming level is different from the second zooming level; and
    generating said slide show of said still image to simulate video effect by panning across said still image from said first region to said second region while gradually zooming said still image from said first zooming level of said first region to said second zooming level of said second region.

18. The computer-readable storage medium as set forth in claim 17, wherein said semantic analysis includes human face detection.

19. The computer-readable storage medium as set forth in claim 17, wherein each of said semantic regions further comprises a neighborhood with a predetermined area surrounding a focus of said still image, and information of said focus is recorded in the tag of said still image in Exif format.

20. The computer-readable storage medium as set forth in claim 17, wherein panning said still image from said first region to said second region includes panning along a panning path across at least two of said semantic regions.

21. The computer-readable storage medium as set forth in claim 17, wherein said first zooming level is determined according to a first ratio of said first region area to said still image area and a first distance between said first region center and said still image center, and said second zooming level is determined according to a second ratio of said second region area to said still image area and a second distance between said second region center and said still image center.

22. The computer-readable storage medium as set forth in claim 17, which further comprises the step of determining a zooming status of said still image according to the zooming stats of at least one former still image.

23. A computer-readable storage medium having computer-executable instructions for generating a slide show of a still image by performing the following, comprising:
   performing a semantic analysis of said still image to detect a semantic region of the still image, said still image having a still image area and a still image center, and said semantic region having a semantic region area and a semantic region center;
   establishing a zooming code by determining a first number of zoom-in times indicative of the number of zoom-in times of at least one former still image, determining a second number of zoom-out times indicative of the number of zoom-out times of at least one former still image, determining a ratio of said semantic region area to said still image area, and determining a distance between said semantic region center and said still image center; and
   determining a zooming level of said semantic region and a zooming status of said still image according to the zooming code; and
   generating said slide show of said still image to simulate video effect by zooming said still image according to said zooming level and said zooming status.

24. The computer-readable storage medium as set forth in claim 23, wherein said semantic analysis includes human face detection.

25. A computer-readable storage medium having computer-executable instructions for generating a slide show of a still image by performing the following, comprising:
   performing non-semantic analysis of said still image to detect non-semantic regions of the still image;
   selecting a first region and a second region from among said non-semantic regions of the still image, wherein said first region and said second region are different regions of the still image;
   determining a first zooming level of said first region and a second zooming level of said second region, wherein the first zooming level is different from the second zooming level; and
   generating said slide show of said still image to simulate video effect by panning across said still image from said first region to said second region while gradually zooming said still image from said first zooming level of said first region to said second zooming level of said second region.

26. The computer-readable storage medium as set forth in claim 25, wherein said non-semantic analysis includes symmetric region detection.

27. The computer-readable storage medium as set forth in claim 25, wherein each of said non-semantic regions further comprises a neighborhood with a predetermined area surrounding a focus of said still image, and information of said focus is recorded in the tag of said still image in Exif format.

28. The computer-readable storage medium as set forth in claim 25, wherein panning said still image from said first region to said second region includes panning along a panning path across at least two of said non-semantic regions.

29. The computer-readable storage medium as set forth in claim 25, wherein said first zooming level is determined according to a first ratio of said first region area to said still image area and a first distance between said first region center and said still image center, and said second zooming level is determined according to a second ratio of said second region area to said still image area and a second distance between said second region center and said still image center.

30. The computer-readable storage medium as set forth in claim 25, which further comprises the step of determining a zooming status of said still image according to the zooming status of at least one former still image.

31. A computer-readable storage medium storing computer-executable instructions for generating a slide show of a still image, said computer-readable storage medium including:
   at least an analysis module comprising computer executable instructions for performing a semantic analysis of said still image to detect semantic regions of the still image and selecting a first region and a second region from among said semantic regions of the still image, wherein said first region and said second region are different regions of the still image;
   a zooming level/status determining module comprising computer executable instructions for determining a first zooming level of said first region and a second zooming level of said second region, wherein the first zooming level is different from the second zooming level; and
   a slide show generating module comprising computer executable instructions for generating said slide show of said still image to simulate video effect by panning across said still image from said first region to said second region while gradually zooming said still image from said first zooming level of said first region to said second zooming level of said second region.

32. The computer-readable storage medium as set forth in claim 31 comprising a second analysis module comprising computer executable instructions for performing non-semantic analysis of said still image and detecting non-semantic regions thereof and selecting a first region Thereof and a second region from among said non-semantic regions.

33. The computer-readable storage medium as set forth in claim 31, wherein said semantic analysis includes human face detection, default object detection or user-defined object detection.

34. The computer-readable storage medium as set forth in claim 31, wherein each of said semantic regions further comprises a neighborhood with a predetermined area surrounding a focus of said still image, and information of said focus is recorded in the tag of said still image in Exif format.

35. The computer-readable storage medium as set forth in claim 31, wherein panning of said still image from said first region to said second region includes panning along a panning path across at least two of said semantic regions.

36. The computer-readable storage medium as set forth in claim 31, wherein said first zooming level is determined according to a first ratio of said first region area to said still image area and a first distance between said first region center and said still image center, and said second zooming level is determined according to a second ratio of said second region area to said still image area and a second distance between said second region center and said still image center.

37. The computer-readable storage medium as set forth in claim 31, wherein said zooming level/status determining module may be employed for determining a zooming status of said still image according to the zooming status of at least one former still image.

38. A computer-readable storage medium as set forth in claim 31, wherein a portion of said first region overlaps with a portion of said second region.

39. A computer-readable storage medium storing computer-executable instructions for generating a slide show of a still image, said computer-readable storage medium including:
   a first analysis module comprising computer executable instructions for performing a semantic analysis of said still image to detect a semantic region of the still image;
   a second analysis module comprising computer executable instructions for performing non-semantic analysis of said still image, detecting non-semantic regions of the still image and selecting a first region and a second region from said non-semantic regions of the still image, wherein said first region and said second region are different regions of the still image;
   a zooming code determining module comprising computer executable instructions for establishing a zooming code by determining a first number of zoom-in times indicative of the number of zoom-in times of at least one former still image, determining a second number of zoom-out times indicative of the number of zoom-out times of at least one former still image, determining a ratio of said semantic region area to said still image area, and determining a distance between said semantic region center and said still image center; and
   a zooming level/status determining module comprising computer executable instructions for determining a zooming level of said semantic region and a zooming status of said still image according to the zooming code; and
   a slide show generating module comprising computer executable instructions for generating said slide show of said still image to simulate video effect by zooming said still image centered on said semantic region according to said zooming level and said zooming status.

40. The computer-readable storage medium as set forth in claim 39, wherein said semantic analysis includes human face detection, default object detection or user-defined object detection.

41. A computer-readable storage medium as set forth in claim 39, wherein a portion of said first region overlaps with a portion of said second region.

42. A computer-readable storage medium storing computer-executable instructions for generating a slide show of a still image, said computer-readable storage medium including:
   at least an analysis module comprising computer executable instructions for performing non-semantic analysis of said still image and detecting non-semantic regions of the still image and selecting a first region and a second region from among said non-semantic regions of the still image, wherein said first region and said second region are different regions of the still image;
   a zooming level/status determining module comprising computer executable instructions for determining a first zooming level of said first region and a second zooming level of said second region, wherein the first zooming level is different from the second zooming level; and
   a slide show generating module comprising computer executable instructions for generating said slide show of said still image to simulate video effect by panning across said still image from said first region to said second region while gradually zooming said still image from said first zooming level of said first region to said second zooming level of said second region.

43. The computer-readable storage medium as set forth in claim 42 comprising a second analysis module comprising computer executable instructions for performing non-semantic analysis of said still image and detecting non-semantic regions thereof and selecting a first region and a second region from among said non-semantic regions.

44. The computer-readable storage medium as set forth in claim 42, wherein said non-semantic analysis includes symmetric region detection.

45. The computer-readable storage medium as set forth in claim 42, wherein each of said non-semantic regions further comprises a neighborhood with a predetermined area surrounding a focus of said still image, and information of said focus is recorded in the tag of said still image in Exif format.

46. The computer-readable storage medium as set forth in claim 42, wherein panning of said still image from said first region to said second region includes panning along a panning path across at least two of said non-semantic regions.

47. The computer-readable storage medium as set forth in claim 42, wherein said first zooming level is determined according to a first ratio of said first region area to said still image area and a first distance between said first region center and said still image center, and said second zooming level is determined according to a second ratio of said second region area to said still image area and a second distance between said second region center and said still image center, wherein said first zooming level may be larger than, equal to or smaller than said second zooming level.

48. The computer-readable storage medium as set forth in claim 42, wherein said zooming level/status determining module may be employed for determining a zooming stabs of said still image according to the zooming status of at least one former still image.

49. A computer-readable storage medium as set forth in claim 42, wherein a portion of said first region overlaps with a portion of said second region.

* * * * *